(12) United States Patent
Lin et al.

(10) Patent No.: US 8,808,784 B2
(45) Date of Patent: Aug. 19, 2014

(54) SHORTENING COMPOSITIONS

(75) Inventors: Peter Yau-Tak Lin, Liberty, OH (US); Deborah Jean Back, Cleves, OH (US); Donald Benjamin Appleby, Cincinnati, OH (US); James M. Robertson, Kansas City, MO (US); Steven Robert Baker, Kansas City, MO (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/479,320

(22) Filed: May 24, 2012

(65) Prior Publication Data

US 2012/0328763 A1 Dec. 27, 2012

Related U.S. Application Data

(60) Provisional application No. 61/500,467, filed on Jun. 23, 2011.

(51) Int. Cl.
*A23D 9/007* (2006.01)
*A23D 7/01* (2006.01)
*A23D 9/013* (2006.01)

(52) U.S. Cl.
CPC ............... *A23D 7/011* (2013.01); *A23D 7/013* (2013.01); *A23D 9/013* (2013.01)
USPC .......................................... 426/611; 426/607

(58) Field of Classification Search
USPC .................................................. 426/611, 607
See application file for complete search history.

(56) References Cited

U.S. PATENT DOCUMENTS

| 4,797,300 | A | * | 1/1989 | Jandacek et al. | 426/549 |
| 4,822,875 | A |   | 4/1989 | McCoy | |
| 4,835,001 | A |   | 5/1989 | Mijac | |
| 4,940,601 | A | * | 7/1990 | Orphanos et al. | 426/601 |
| 4,952,687 | A |   | 8/1990 | Bodor | |
| 5,021,256 | A | * | 6/1991 | Guffey et al. | 426/601 |
| 5,085,884 | A | * | 2/1992 | Young et al. | 426/611 |
| 5,306,514 | A | * | 4/1994 | Letton et al. | 426/531 |
| 5,306,515 | A | * | 4/1994 | Letton et al. | 426/531 |
| 5,306,516 | A | * | 4/1994 | Letton et al. | 426/531 |
| 5,532,019 | A |   | 7/1996 | Miller | |
| 6,077,556 | A | * | 6/2000 | Letton et al. | 426/549 |
| 6,261,628 | B1 | * | 7/2001 | Howie | 426/611 |
| 2011/0129592 | A1 | * | 6/2011 | Appleby et al. | 426/631 |

FOREIGN PATENT DOCUMENTS

| EP | 0290420 | * | 6/1988 |
| EP | 0384508 | A2 | 8/1990 |

* cited by examiner

*Primary Examiner* — Carolyn Paden
(74) *Attorney, Agent, or Firm* — Melissa G Krasovec; Melody Jones

(57) ABSTRACT

Disclosed herein are shortening compositions comprising from about 40% to about 90% sucrose polyester, by weight, wherein said shortening compositions may comprise, based on total weight of the shortening composition, a Solid Fat Index of from about 5% to about 10% solids at 40° C. and a Firmness of from about 90,000 Pa to about 1,500,000 Pa.

16 Claims, No Drawings

SHORTENING COMPOSITIONS

CROSS-REFERENCE TO RELATED APPLICATIONS

This application claims priority under 35 U.S.C. §119(e) to U.S. Provisional Application Ser. No. 61/500,467, filed Jun. 23, 2011.

FIELD OF THE INVENTION

This application relates to shortening compositions that comprise sucrose polyesters and methods of making and using such shortening compositions.

BACKGROUND OF THE INVENTION

One of the most common health problems among people today is obesity. The condition is linked to ingestion of a greater number of calories than are expended. Fat comprises a concentrated source of calories in a person's diet, and thus, there remains a continuing need to reduce and/or replace fat in food products. One way of reducing and/or replacing fat content in food products is through the employment of shortening compositions that comprise non-digestible fats (e.g., sucrose polyesters). Because replacing higher percentages of fat with sucrose polyesters ("SPE") will correspondingly lower the number of calories in a given shortening composition, there is a continuing need for quality shortening compositions that comprise higher percentages of sucrose polyesters.

Shortening compositions generally contain a hard stock fraction, an intermediate melting fraction ("IMF"), and a liquid oil fraction. One established way to create a sucrose polyester containing shortening is to replace at least a portion of the intermediate melting fraction with a sucrose polyester blend. Traditionally, these sucrose polyester containing shortenings only comprised up to 35% sucrose polyester, but recently, there has been interest in producing shortening compositions that have higher percentages of sucrose polyesters (e.g., 40% or more sucrose polyester). Shortening compositions that comprise higher percentages of sucrose polyesters (e.g., a shortening composition with 75% sucrose polyester) have been formulated in the past, however, the food products that employed these shortening compositions commonly have exhibited the drawbacks of 1) palatability concerns (e.g., an undesirable, waxy mouth feel) and/or 2) workability concerns (e.g., incompatibility with food processing equipment).

Sucrose polyesters, because of their bulk and shape, form different crystalline structures having melting profiles that are quite dissimilar to certain natural fats and oils. By partially hydrogenating liquid sucrose polyesters, it is possible to increase the melting point by converting some of the sucrose polyesters' unsaturated carbon chains into trans and saturated carbon chains. This hydrogenation process results in an overall increase in the melting profile of the resulting sucrose polyester, which leads to a high solids content at body temperatures (approximately 37° C.). When these partially hydrogenated sucrose polyesters are added into shortening formulations as an intermediate melting fraction, such a high solids content leads to palatability concerns (e.g., an undesirable, waxy mouth feel) in the food products that incorporate the shortenings. This is particularly disadvantageous when the shortenings are employed to produce frostings, icings, baked goods or other confections because such products are favored by the consumer, in part, due to a particular mouth feel associated with these types of products (i.e., the ability for the product to melt in a consumer's mouth). Further, when shortenings comprising higher percentages of sucrose polyesters are employed to produce frostings, icings, dough, baked goods and other confections, the workability (e.g., plasticity, shear resistance) of the products that incorporate the shortenings may become incompatible with food processing equipment. For example, when a traditional shortening that comprises 75% sucrose polyester is employed in a pie crust dough application, the dough is often too sticky for compatibility with high speed processing equipment.

A balance between palatability and workability in food products employing a shortening with a high percentage of sucrose polyester is a difficult endeavor, as alleviation of one drawback may increase the prominence of the other drawback. Accordingly, there remains a continuing need for shortenings that comprise higher percentages of sucrose polyester, wherein the shortenings have rheological properties that allow a manufacturer to desirably work with and incorporate the shortenings into certain food products, while also providing the consumer a desirable mouth feel when eating such food products.

SUMMARY OF THE INVENTION

Sucrose polyester containing shortening compositions, and methods of making and using such compositions, are disclosed herein.

In one embodiment, the present disclosure provides for shortening compositions comprising from about 40% to about 90% sucrose polyester, by weight, wherein the shortening compositions comprise, based on total weight of the shortening composition, a Solid Fat Index of from about 5% to about 10% solids at 40° C.; and a Firmness of from about 90,000 Pa to about 1,500,000 Pa.

In another embodiment, the present disclosure provides for shortening compositions comprising from about 40% to about 90% sucrose polyester, by weight, wherein the shortening compositions comprise, based on total weight of the shortening composition, a Solid Fat Index of from about 5% to about 10% solids at 40° C.; and a Yield Value of from about 300 Pa to about 10,000 Pa.

In yet another embodiment, the present disclosure provides for shortening compositions comprising from about 40% to about 90% sucrose polyester, by weight, wherein the shortening compositions comprise a hard stock fraction; an intermediate melting fraction comprising a blend of sucrose polyesters, wherein each sucrose polyester comprises a sucrose moiety and a plurality of fatty acid ester moieties; and a liquid fraction; wherein from about 25% to about 50% of the combined fatty acid ester moieties of the blend of sucrose polyesters in the intermediate melting fraction comprise a carbon chain that contains trans content.

In yet another embodiment, the present disclosure provides for shortening compositions comprising from about 40% to about 90% sucrose polyester, by weight, wherein the shortening compositions comprise a hard stock fraction; an intermediate melting fraction comprising a blend of sucrose polyesters, wherein each sucrose polyester comprises a sucrose moiety and a plurality of fatty acid ester moieties; and a liquid fraction; wherein from about 50% to about 75%, by weight, of the combined fatty acid ester moieties of the blend of sucrose polyesters in the intermediate melting fraction are palmitic fatty acid ester moieties.

DETAILED DESCRIPTION OF THE INVENTION

As used herein, the articles "a" and "an" when used in a claim, are understood to mean one or more of what is claimed or described.

As used herein, the terms "include", "includes" and "including" are meant to be non-limiting.

As used herein, the term "comprising" means various components conjointly employed in the preparation of the compositions of the present disclosure. Accordingly, the terms "consisting essentially of" and "consisting of" are embodied in the term "comprising".

As used herein, the "complete melting point" means the temperature at which the last visible traces of solids disappear. The complete melting point of a given composition or component is measured in accordance with AOCS Method Cc 1-25 (American Oil Chemists' Society).

As used herein, the term "lower alcohol" means a $C_1$, $C_2$, $C_3$, or $C_4$ alcohol, and combinations thereof.

As used herein, the term "melting point" means the temperature at which a component starts to change from the solid to the liquid phase.

As used herein, the term "octa-sucrose polyester," means that eight of the available hydroxyl moieties on a sucrose molecule are esterified with a fatty acid; the term "hepta-sucrose polyester" means that seven of the available hydroxyl moieties on a sucrose molecule are esterified with a fatty acid; the term "hexa-sucrose polyester" means that six of the available hydroxyl moieties on a sucrose molecule are esterified with a fatty acid; the term "penta-sucrose polyester" means that five of the available hydroxyl moieties on a sucrose molecule are esterified with a fatty acid.

As used herein, "Solid Fat Content" or "SFC" means the percentage of a fat or oil that exists in crystalline form at a given temperature.

As used herein, the Solid Fat Index, or "SFI" is an empirical measure of solid fat content (SFC) at standardized temperature check points.

As used herein, the term "sucrose polyester" or "SPE" means a molecule comprising a sucrose moiety and a plurality of fatty acid moieties, wherein at least five of the available hydroxyl groups on the sucrose are esterified with a fatty acid. The term "sucrose polyester" may also be used herein to refer to a composition that contains a blend of sucrose polyester molecules.

As used herein, "high trans SPE IMF" means a sucrose polyester containing intermediate melting fraction that has about 25% to about 50% trans content.

As used herein, "trans content" means the percentage of trans fatty acid esters, when compared with the total number of fatty acid esters, in a given composition.

As used herein, "trans fatty acid ester" means a 16 or 18 carbons long (e.g., $CH_3(CH_2)_{14}COOH$ or $CH_3(CH_2)_{16}COOH$) fatty acid ester with at least one double bond in the trans configuration.

As used herein, "palmitic fatty acid ester" means a completely saturated fatty acid ester that is 16 carbons long (i.e., $CH_3(CH_2)_{14}COOH$).

As used herein, "high palmitic SPE IMF" means a sucrose polyester containing intermediate melting fraction that has at least 50% palmitic fatty acid content.

As used herein, "palmitic fatty acid content" means the percentage of palmitic fatty acid esters, when compared with the total number of fatty acid esters, in a given composition.

As used herein, "low waxiness SPE IMF" means an sucrose polyester containing intermediate melting fraction that has an SFC of from about 3% to about 10% at 40° C., while retaining high levels of solids at lower temperatures (as compared to traditional sucrose polyester containing intermediate melting fractions). For example, high-trans SPE IMF and high-palmitic SPE IMF are types of low waxiness SPE IMFs.

As used herein, the terms "Olestra®" and "Olean®" have the same meaning and can be used interchangeably.

As used herein, all tests and measurements, unless otherwise specified, are made at 25° C.

The test methods disclosed in the Test Methods Section of the present application should be used to determine the respective values of the parameters of Applicants' inventions.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited are, in relevant part, incorporated herein by reference; the citation of any document is not to be construed as an admission that it is prior art with respect to the present invention.

To be useful in frostings, fillings, icings, baked goods, candy and other food and confection products, shortening compositions comprising sucrose polyesters are ideally solid at room temperature but have a melting point near or at body temperature (about 37° C.). The melting point and melting profile of the shortening compositions utilized in frostings, fillings, icings, baked goods, candy and other food and confection products contribute to the desired consumer mouth-feel associated with these types of food products. Ideally, such shortening compositions will contain little to no solids at body temperature (about 37° C.). As stated above, one problem in the art as it relates to employing particular sucrose polyester containing shortenings (especially shortenings containing high weight percentages of sucrose polyester) in these types of food products is the ability to provide a food product that delivers to the consumer a desired mouth feel. Another problem in the art is the ability to incorporate such shortening compositions into food products, while preserving the food product's compatibility with food processing equipment.

Disclosed herein are shortening compositions containing high weight percentages of sucrose polyester (greater than 40%) that have a melting profile such that the shortening compositions provide consumers a desired mouth feel suited for frostings, fillings, icings, dough, baked goods, candy and other food and confection products. Such shortening compositions also possess the rheological properties that allow a manufacturer to desirably work with and incorporate the shortenings into food products such as frostings, fillings, icings, dough, baked goods, candy and other food and confection products.

Shortening Compositions:

Disclosed herein are shortening compositions comprising from about 40% to about 90%, or from about 50% to about 85%, or from about 55% to about 80%, or from about 60% to about 80%, or about 70% to about 80%, or about 75% sucrose polyester, by weight, wherein the shortening compositions comprise:

a. based on total weight of the shortening composition, a Solid Fat Index of from about 3% to about 10%, or from about 5% to about 10%, solids at 40° C.;

b. a Firmness of from about 90,000 Pa to about 1,500,000 Pa, or from about 90,000 Pa to about 900,000 Pa, or from about 100,000 Pa to about 600,000 Pa.

In another aspect, a Yield Value of the shortening compositions detailed herein may be from about 300 Pa to about 10,000 Pa, or from about 500 Pa to about 9,000 Pa, or from about 1,000 Pa to about 8,000 Pa.

In another aspect, shortening compositions comprising from about 40% to about 90%, or from about 50% to about 85%, or from about 55% to about 80%, or from about 60% to about 80%, or about 70% to about 80%, or about 75% sucrose polyester, by weight, may comprise:

a. a hard stock fraction;
b. an intermediate melting fraction comprising a blend of sucrose polyesters, wherein each sucrose polyester comprises a sucrose moiety and a plurality of fatty acid ester moieties; and
c. a liquid fraction;

wherein from about 25% to about 50%, by weight, of the combined fatty acid ester moieties of the sucrose polyesters in the blend comprise a carbon chain that contains trans content.

In another aspect, shortening compositions comprising from about 40% to about 90%, or from about 50% to about 85%, or from about 55% to about 80%, or from about 60% to about 80%, or about 70% to about 80%, or about 75% sucrose polyester, by weight, may comprise:

a. a hard stock fraction;
b. an intermediate melting fraction comprising a blend of sucrose polyesters, wherein each sucrose polyester comprises a sucrose moiety and a plurality of fatty acid ester moieties; and
c. a liquid fraction;

wherein from about 50% to about 75%, by weight, of the combined fatty acid ester moieties of the sucrose polyesters in the blend are palmitic fatty acid ester moieties.

In another aspect, shortening compositions detailed herein may comprise, based on total weight of the shortening composition, from about 5% to about 15%, or from about 5% to about 12%, of the hard stock fraction; from about 10% to about 30%, or from about 10% to about 30%, of the intermediate melting fraction; and from about 55% to about 85%, or from about 63% to about 85%, of the liquid fraction.

Hard Stock Fraction:

In embodiments of the shortening compositions detailed herein, the hard stock fraction may comprise monoglycerides and diglycerides of predominately saturated fatty acids, or monoglycerides, diglycerides and triglycerides of predominately saturated acids, or monoglycerides, diglycerides, and sucrose polyesters of predominately saturated fatty acids. In another aspect, the hard stock fraction may comprise waxes, sterols and sterol esters. Or in another aspect, the hard stock fraction may comprise other edible high melting components which provide fast nucleation and small fat crystal formation to the shortening compositions. One particular hardstock that may be employed in the shortening compositions detailed herein is Trancendim® (available from Caravan Ingredients, Kansas City, Kans.).

Intermediate Melting Fraction:

The intermediate melting fractions ("IMF") utilized in the shortening compositions detailed herein are generally referred to as low waxiness SPE IMFs. A low waxiness SPE IMF contains sucrose polyester and has an SFC of from about 3% to about 10% at 40° C., while also retaining high levels of solids at lower temperatures (as compared to traditional sucrose polyester containing intermediate melting fractions). A low waxiness SPE IMF may be obtained by either controlling the trans content of the sucrose polyesters in the IMF ("High-Trans SPE IMF"), or by controlling the palmitic content of the sucrose polyesters in the IMF (High-Palmitic SPE IMF"), both of which are further detailed below.

High-Trans SPE IMF:

In one aspect, the High-Trans SPE IMF may comprise a blend of sucrose polyesters, wherein each sucrose polyester comprises a sucrose moiety and a plurality of fatty acid ester moieties, wherein:

a. from about 90% to about 100%, or from about 95% to about 100%, by weight, of the sucrose polyesters in the blend are selected from a group consisting of octa-, hepta-, and hexa-sucrose polyesters;

b. from about 25% to about 50%, or from about 40% to about 50%, or from about 40% to about 45%, by weight, of the combined fatty acid ester moieties of the sucrose polyesters in the blend comprise a carbon chain that contains trans content; and c. from about 60% to about 100%, or from about 75% to about 95%, or from about 85% to about 90%, by weight, of the combined fatty acid ester moieties of the sucrose polyesters in the blend comprise a $C_{18}$ carbon chain, with the balance of the fatty acid ester moieties of the sucrose polyesters in the blend comprising a carbon chain independently selected from $C_{12}$-$C_{16}$ or $C_{20}$-$C_{22}$ carbon chains.

In another aspect, from about 40% to about 90%, or from about 50% to about 85%, or from about 60% to about 70%, or about 75%, by weight, of the combined fatty acid ester moieties of the sucrose polyesters in the blend may comprise an unsaturated carbon chain.

In another aspect, the carbon chains that contain a trans content may be $C_{18}$ carbon chains selected from a group consisting of $C_{18:1}$ trans, $C_{18:2}$ trans, and combinations thereof.

In another aspect, the High-Trans SPE IMF may comprise a fatty acid ester derived from an edible oil comprising at least one trans fatty acid. In one aspect, the edible oil comprising a trans fatty acid may be selected from rapeseed oil, tallow oil, coconut oil, babassu oil, corn oil, lard, olive oil, peanut oil, sesame oil, soybean oil, canola oil, palm oil, sunflower oil, safflower oil, cottonseed oil, and combinations thereof.

In another aspect, a High-Trans Olestra® IMF may exhibit a thixotropic area of from about 50,000 to about 300,000, or from about 100,000 to about 200,000 Pa/second at 33.3° C., as measured using the Test Methods described herein. In one aspect, the composition may exhibit a thixotropic area of from about 50,000 to about 100,000 Pa/second at 33.3° C., as measured using the Test Methods described herein.

In another aspect, a High-Trans Olestra® IMF may comprise:

a. from about 60% to about 99%, based on total weight of the sucrose polyester blend, of a sucrose polyester has an SFC of from about 3% to about 10% at 40° C., while also retaining high levels of solids at lower temperatures; and b. from about 1% to about 40%, or from about 2% to about 20%, or from about 5% to about 8%, based on total weight of the sucrose polyester blend, of a sucrose polyester having a complete melting point of from about 40° C. to about 100° C., or from about 60° C. to about 75° C., wherein the sucrose polyester may be solid at room temperature.

In another aspect, the High-Trans SPE IMF may comprise, based on total weight of the sucrose polyester blend, from about 0% to about 0.5% penta-sucrose polyesters.

High-Palmitic SPE IMF:

In one aspect, the High-Palmitic SPE IMF may comprise a blend of sucrose polyesters, wherein each sucrose polyester comprises a sucrose moiety and a plurality of fatty acid ester moieties, wherein:
  a. from about 90% to about 100%, or from about 95% to about 100%, by weight, of the sucrose polyesters in the blend are selected from a group consisting of octa-, hepta-, and hexa-sucrose polyesters;
  b. from about 50% to about 75%, or from about 55% to about 70%, or from about 60% to about 65%, by weight, of the combined fatty acid ester moieties of the sucrose polyesters in the blend are palmitic fatty acid ester moieties; and
  c. from about 50% to about 90%, or from about 55% to about 75% or from about 55% to about 65%, by weight, of the combined fatty acid ester moieties of the sucrose polyesters in the blend comprise a $C_{1-6}$ carbon chain, with the balance of the fatty acid ester moieties of the sucrose polyesters in the blend comprising a carbon chain independently selected from $C_{12}$-$C_{14}$ or $C_{18}$-$C_{22}$ carbon chains.

In another aspect, from about 10% to about 50%, or from about 10% to about 30%, or from about 10% to about 20%, or about 10%, by weight, of the combined fatty acid ester moieties of the sucrose polyesters in the blend may comprise an unsaturated carbon chain.

In another aspect, the High-Palmitic SPE IMF may comprise a fatty acid ester derived from an edible oil comprising palmitic fatty acid content. In one aspect, the edible oil comprising a trans fatty acid may be selected rapeseed oil, tallow oil, coconut oil, babassu oil, corn oil, lard, olive oil, peanut oil, sesame oil, soybean oil, canola oil, palm oil, sunflower oil, safflower oil, cottonseed oil, and combinations thereof; and in certain cases the oil or oil combinations is fractionated to increase the palmitic fatty acid content.

In another aspect, a High-Palmitic Olestra® IMF may exhibit a thixotropic area of from about 50,000 to about 300,000, or from about 100,000 to about 200,000 Pa/second at 33.3° C., as measured using the Test Methods described herein. In one aspect, the composition may exhibit a thixotropic area of from about 50,000 to about 100,000 Pa/second at 33.3° C., as measured using the Test Methods described herein.

In another aspect, a High-Palmitic Olestra® IMF may comprise:
  a. from about 60% to about 99%, based on total weight of the sucrose polyester blend, of a sucrose polyester has an SFC of from about 3% to about 10% at 40° C., while also retaining high levels of solids at lower temperatures; and
  b. from about 1% to about 40%, or from about 2% to about 20%, or from about 5% to about 8%, based on total weight of the sucrose polyester blend, of a sucrose polyester having a complete melting point of from about 40° C. to about 100° C., or from about 60° C. to about 75° C., wherein the sucrose polyester may be solid at room temperature.

In another aspect, the High-Palmitic SPE IMF may comprise, based on total weight of the sucrose polyester blend, from about 0% to about 0.5% penta-sucrose polyesters.

Liquid Fraction:

The liquid fraction of the shortening compositions may comprise oil and/or sucrose polyester. The oil may be selected from a group consisting of rapeseed oil, tallow oil, coconut oil, babassu oil, corn oil, lard, olive oil, peanut oil, sesame oil, soybean oil, canola oil, palm oil, palm olein, palm kernel, sunflower oil, safflower oil, cottonseed oil, and combinations thereof. In other embodiments of the shortening compositions detailed herein, the liquid fraction may comprise monoglycerides and diglycerides of predominately unsaturated fatty acids and in combination with one or more of the vegetable or seed oils mentioned above.

In another aspect, the Liquid Fraction Olestra may comprise:
  a. from about 60% to about 99%, based on total weight of the sucrose polyester blend, of a sucrose polyester having a complete melting point of less than about 40° C., wherein the sucrose polyester may be liquid at room temperature; and
  b. from about 1% to about 40%, or from about 2% to about 20%, or from about 5% to about 8%, based on total weight of the sucrose polyester blend, of a sucrose polyester having a complete melting point of from about 40° C. to about 100° C., or from about 60° C. to about 75° C., wherein the sucrose polyester may be solid at room temperature.

Optional Components of the Shortenings:

Additional components of the shortening compositions detailed herein (in addition to the hard stock, IMF and liquid fraction) may include emulsifiers such as lecithins, monoglycerides, polysorbate 60, polysorbate 80, propylene glycol monostearate and propylene glycol monopalmitate; flavoring agents such as natural or artificial butter flavors, sugars and acids; stabilizers; antioxidants; chealants such as citric acid, tocopherols, TBHQ (tertiary butylhydroquinone), BHA (butylated hydroxyanisole), BHT (butylhydroxytoluene), rosemary extracts, green tea extracts and EDTA (ethylenediaminetetraacetate); and plant sterols such as sterols and sterol esters.

In another aspect, an average fat crystal particle size of embodiments of the shortening compositions detailed herein may be less than about 7 μm or less than about 5 um. Without wishing to be bound by theory, it is believed that Trancendim® (available from Caravan Ingredients, Kansas City, Kans.) in the hard stock fraction acts as a nucleating agent that produces a large number of nuclei leading to small crystal formation in the shortening compositions. Shortening compositions made without Trancendim® have larger particle size and lower Firmness and Yield Values than those made with Trancendim®.

Further, the fat crystal particles of the shortening compositions detailed herein are of a non-Beta prime polymorph because of an unexpected and surprising interaction between Trancendim® and the sucrose polyester of the intermediate melting fraction (further detailed herein). Beta-prime polymorph is traditionally a highly desirable polymorphism for shortenings because of its inherent temperature stability and shear resistance. When Trancendim® is mixed with triglycerides to form a triglycerides shortening, the polymorphism of the shortening is beta-prime because of the strong beta-prime tendency of Trancendim®. Unexpectedly, when Trancendim® is mixed with sucrose polyester containing intermediate melting fractions to form the shortenings detailed herein, beta-prime polymorphism is not observed. However, in spite of the lack of beta-prime polymorphism, the Trancendim®/sucrose polyester shortenings detailed herein possesses excellent plasticity and shear resistance.

The shortening compositions detailed herein balance the overall caloric reduction with the required rheological properties dictated by the intended application, while delivering the minimal waxiness in the finished food product. To accomplish this, the levels of Trancendim® and low waxiness SPE IMF are balanced to achieve the desired rheological/workability properties (Firmness and Yield Values) while also taking into account the waxiness by controlling the SFC at 40° C. The total caloric reduction may then be achieved by adding a sufficient amount of liquid fraction to the low waxiness SPE IMF level to reach the desired total SPE level.

Test Methods

For purposes of the present application, Solid Fat Content; Trans Content; Thixotropic Area; Fatty Acid Composition; Work Index; Firmness; Yield Value and Fat Crystal Particle Size are determined as follows:

Solid Fat Content ("SFC")—A sample of the test composition is heated to a temperature of 140° F. (60° C.) for at least 30 minutes or until the sample is completely melted. The melted sample is then tempered as follows: at 80° F. (26.7° C.) for 15 minutes; at 32° F. (0° C.) for 15 minutes; at 80° F. (26.7° C.) for 30 minutes; and at 32° F. (0° C.) for 15 minutes. After tempering, the SFC values of the sample at temperatures of 50° F. (10° C.), 70° F. (21.1° C.), 80° F. (26.7° C.), 92° F. (33.3° C.) and 98.6° F. (37° C.), is determined by pulsed nuclear magnetic resonance (PNMR) after equilibration for 30 minutes at each temperature. The method for determining SFC values by PNMR is described in Madison and Hill, J. Amer. Oil Chem. Soc., Vol. 55 (1978), pp. 328-31. Measurement of SFC by PNMR is also described in A.O.C.S. Official Method Cd. 16-81, Official Methods and Recommended Practices of The American Oil Chemists Society. 3rd. Ed., 1987.

Measurement of Trans Content—The trans content, or trans fatty acid content, as a percentage of the double bonds of the unsaturated fatty acids in the polyester sample, is determined by Fourier transform infrared spectrophotometry (FTIR). The FTIR method used is described in AOCS Official Method Cd 14d-99, Reapproved in 2009, "Rapid Determination of Isolated trans Geometric Isomers in Fats and Oils by Attenuated Total Reflection Infrared Spectroscopy" and is accurate for samples containing equal to or greater than 1% trans isomer. The trans value obtained by FTIR, together with the fatty acid composition of the polyester sample, is used to calculate the ratio of cis:trans double bonds.

Determination of Thixotropic Area—Samples are prepared by transferring about 8.0 grams of sample into a 57 mm aluminum pan. The sample is heated to above 113° C. until completely liquid, then tempered by cooling to 29° C. with agitation. The sample is then held at 21° C. for 7 days. Using a suitable cone and plate rheometer (such as Contraves Rheomat 115A, cone CP-6) maintained at 37.8° C. and capable of measuring the non-Newtonian flow curve hysteresis for ascending and descending shear rates programmed from 0 to 800 $s^{-1}$, the rheometer is held at 0 s-1 for 120 seconds, then raised to 800 $sec^{-1}$ in 7.5 minutes, held for 1 s, then decreased to 0 $s^{-1}$ in 7.5 min to measure the thixotropic area. The rheometer accuracy is checked with viscosity standards such as Cannon ASTM Certified Viscosity Standards, S-2000 and N-350 or equivalent. A sufficient amount of the test sample is placed on the rheometer plate to fill the gap between the plate and cone. The thixotropic area is then measured.

Determination of Fatty Acid Composition—The fatty acid composition of the sucrose polyesters disclosed may be measured by gas chromatography. First, fatty acid methyl esters of the sucrose polyesters are prepared via any standard method known in the art (for example, via transesterification using sodium methoxide), and then separated on a capillary column (Supelco SP2340, 60×0.32 mm×0.2 micron), utilizing a Hewlett-Packard Model 6890 gas chromatograph equipped with a Flame Ionization Detector and a Hewlett-Packard automatic sampler, Model 7683. The fatty acid methyl esters are separated by chain length, degree of unsaturation and isomeric variations including cis, trans and conjugation. The method is programmed to run for 50 minutes ramping the temperature from 140-195° C. with and injection temperature of 250° C. and a detection temperature of 325° C. For calibration, the fatty acid methyl ester reference standard Nuchek Prep (#446) is used.

Determination of Firmness and Yield Stress—This rheological method measures the Firmness and Yield Stress using a TA AR1500 Rheometer. The method consist of measuring the oscillatory stress from 0.1 Pa to 10000 Pa over a 3 minute sweep at 21° C. A 20 mm serrated (crosshatched) geometry is used and the gap is set at 1500 um. The sample is loaded directly onto the base of the Rheometer (~1 g of sample); the serrated plate is lowered and excess sample is wiped from the edges of the serrated cone. The sample is equilibrated to 21° C. and scanned from 0.1 to 10000 Pa (oscillatory sweep). A plot is constructed of the oscillatory stress versus G'. The firmness is measured as the magnitude of G'. The yield stress is amount of the oscillatory stress required to induce flow and this is the cusp of the curve where G' drops dramatically.

Determination of Fat Crystal Particle Size—The fat crystal particle size of the shortening compositions may be estimated at room temperature with a Nikon Micophot video-enhanced light microscope (VELM) using Hoffman Modulation Contrast (HMC) optics according to the following method:

1. A small portion (i.e., 1-10 mg) of the sample with the shortening particles dispersed therein is placed on a microscope slide and covered. The slide is placed in the microscope.
2. The sample is examined using a HMC 100× oil objective as the standard lens in conjunction with a 10× eyepiece lens.
3. A Microscope-mounted video camera and associated controller are used for video enhancement to facilitate differentiation between sample and background.
4. The particle size of the shortening particle is measured in microns (um).

This method permits the differentiation of particles having a particle size just within the resolution of the VELM (approximately 0.2-0.5 um). (Note: No special sample preparation is required, other than obtaining a representative sample.)

REFERENCE

Robert Hoffman, "The Modulation Contrast Microscope: Principles and performances", *Journal of Microscopy*, Vol. 110, Pt 3, August 1977, pp. 205-222.

EXAMPLES

Example 1

High Trans Methyl Ester 20 kilograms of partially hydrogenated soybean oil (Product No. LP426 available from Golden Brands of Louisville, Ky.) are placed in a 30 liter reaction vessel equipped with a stirrer and reflux condenser and reacted with 5375 grams of methanol using 226.6 grams of sodium methoxide as catalyst. The mixture is stirred at 65° C. for 6 hours; methanol is allowed to reflux. The reaction mixture is then allowed to rest without stirring until the glycerin byproduct settles to the bottom of the vessel. The glycerin layer is then removed and the methyl ester layer is washed with 10% water by weight of the methyl ester at 30° C. to remove residual methanol, catalyst, soap and any remaining glycerin. The wash process is repeated two additional times. The methyl esters are then dried under vacuum (25 mm Hg) at 95° C. The methyl esters are then distilled in a wiped film evaporator at 195° C. and ~1 mm Hg absolute pressure to separate the methyl esters from any un-reacted glycerides. The methyl esters have the following fatty acid composition:

| | |
|---|---|
| $C_{16}$ | 12% |
| $C_{18}$ | 10.9% |
| $C_{18:1}$ trans | 36.4% |
| $C_{18:1}$ cis | 29.3% |
| $C_{18:2}$ trans | 1.6% |
| $C_{18:2}$ cis | 0.3% |
| $C_{18:3}$ cis | 0% |

Example 2

High Trans SPE IMF

A liquid sucrose polyester sample is prepared using the methyl ester prepared in Example 1. 1073 grams of the methyl ester of Example 1, 212 grams of a milled mixture of sucrose and potassium palmitate and 4.5 grams of potassium carbonate are added to a 5 liter reaction vessel equipped with overhead mechanical stirrer, heating mantel and nitrogen sparge tube. The contents of the reaction flask are heated to 135° C. with vigorous stirring and nitrogen sparge for ~3 hours. Another 1073 grams of the methyl ester of Example 1 is then added along with 4.5 grams of $K_2CO_3$. The reaction is continued at 135° C. until the total conversion of sucrose polyester measures >75% octa-ester.

The crude reaction mix from above is then hydrated with ~230 mls water and the contents of the flask are allowed to set without stifling. The top layer (oil layer) is decanted away from the hydrated soap layer. The oil layer is then dried at 95° C. (25 mm Hg) until free of residual water. The oil layer is then bleached with 1% Trisyl (available from W.R. Grace) and pressure filtered to remove the bleaching earth. The treated oil layer is then passed through a wiped film evaporator to remove residual methyl esters. The resulting liquid sucrose polyester has the following properties:

| Sucrose ester distribution | |
|---|---|
| Sucrose octa-ester | 81.6% |
| Sucrose hepta-ester | 18.1% |
| Sucrose hexa-ester | 0.3% |
| Sucrose penta-ester | 0.0% |

| Fatty Acid Composition | |
|---|---|
| $C_{16}$ | 12.6% |
| $C_{18}$ | 10.6% |
| $C_{18:1}$ trans | 36.9% |
| $C_{18:1}$ cis | 31.8% |
| $C_{18:2}$ trans | 1.4% |
| $C_{18:2}$ cis | 0.6% |
| $C_{18:3}$ cis | 0.3% |

Example 3

High Trans Olestra® IMF 93 grams of the liquid sucrose polyester from Example 2 are combined with 7 grams of a solid sucrose polyester having a melting point of 65° C. to give a sucrose polyester blend. The solid sucrose polyester has the following properties:

| Sucrose ester distribution of the solid Component | |
|---|---|
| Sucrose octa-ester | 78.9% |
| Sucrose hepta-ester | 21.0% |
| Sucrose hexa-ester | 0.2% |
| Sucrose penta-ester | 0.0% |

| Fatty Acid Composition of the Solid Component | |
|---|---|
| $C_{16}$ | 1.5% |
| $C_{18}$ | 3.9% |
| $C_{18:1}$ cis | 8.3% |
| $C_{18:2}$ cis | 3.0% |
| $C_{20:0}$ | 6.8% |
| $C_{22:0}$ | 76% |

The resulting sucrose polyester blend (comprising the liquid sucrose polyester from Example 2 and the above detailed solid sucrose polyester) has the following properties:

| Sucrose ester distribution | |
|---|---|
| Sucrose octa-ester | 80.6% |
| Sucrose hepta-ester | 19.1% |
| Sucrose hexa-ester | 0.3% |
| Sucrose penta-ester | 0.0% |

| Fatty Acid Composition | |
|---|---|
| $C_{16}$ | 12.4% |
| $C_{18}$ | 10.5% |
| $C_{18:1}$ trans | 35.1% |
| $C_{18:1}$ cis | 31.1% |
| $C_{18:2}$ trans | 3.3% |
| $C_{18:2}$ cis | 1.7% |
| $C_{18:3}$ cis | 0.6% |
| $C_{20}$ | 0% |
| $C_{22}$ | 5.3% |

Thixotropic area: 53,000 Pa/sec @ 33.3° C.

| SFC | |
|---|---|
| 10° C. | 64.2% |
| 20° C. | 32.5% |
| 30° C. | 7.5% |
| 40° C. | 5.1% |

Example 4

Liquid Fraction Olean®

The properties of the High Trans Olestra® IMF of Example 3 were compared to those of a commercially available sucrose polyester blend marketed by The Procter & Gamble Company under the Olean® brand name. The particular Olean® product utilized in this example is produced from partially hydrogenated soybean oil, in which the hydrogenation conditions are chosen to minimize the formation of trans fatty acid isomers. The fatty acid composition and Solid Fat Contents of both samples are compared below:

| Fatty Acid Composition | Sample Blend from Example 3 | Olean ® brand Olestra ® |
|---|---|---|
| $C_{16}$ | 12.4% | 12.7% |
| $C_{18}$ | 10.5% | 6.7% |
| $C_{18:1}$ trans | 35.1% | 13.5% |
| $C_{18:1}$ cis | 31.1% | 40.3% |
| $C_{18:2}$ trans | 3.3% | 3.0% |
| $C_{18:2}$ cis | 1.7% | 17.4% |
| $C_{18:3}$ cis | 0.6% | 0.5% |
| $C_{20}$ | 0% | 0.7% |
| $C_{22}$ | 5.3% | 3.5% |

| SFC | | |
|---|---|---|
| 10° C. | 64.2% | 10.8% |
| 20° C. | 32.5% | 7.6% |
| 30° C. | 7.5% | 6.1% |
| 40° C. | 5.1% | 5.6% |

| Sucrose ester distribution | | |
|---|---|---|
| Sucrose octa-ester | 80.6% | 80.5% |
| Sucrose hepta-ester | 19.1% | 19.2% |
| Sucrose hexa-ester | 0.3% | 0.3% |
| Sucrose penta-ester | 0% | 0% |
| Thixotropic area | 53,000 Pa/sec @ 33.3° C. | 52,000 Pa/sec @ 33.3° C. |

Example 5

Soy IV40 Olestra® IMF—Traditional IMF

The properties of the sucrose polyester blend of Example 3 were compared to those of liquid sucrose polyesters that were produced on a commercial scale from soybean oil and hydrogenated to produce an IMF sucrose polyester.

| Fatty Acid Composition | Sample Blend from Example 3 | Olestra ® w/Post Hydrogenation |
|---|---|---|
| $C_{16}$ | 12.4% | 11.7% |
| $C_{18}$ | 10.5% | 42.0% |
| $C_{18:1}$ trans | 35.1% | 20.4% |
| $C_{18:1}$ cis | 31.1% | 21.8% |
| $C_{18:2}$ trans | 3.3% | 0.7% |
| $C_{18:2}$ cis | 1.7% | 0% |
| $C_{18:3}$ cis | 0.6% | 0% |
| $C_{20}$ | 0% | 0% |
| $C_{22}$ | 5.3% | 0% |

| SFC | | |
|---|---|---|
| 10° C. | 64.2% | 52.1% |
| 20° C. | 32.5% | 29.0% |
| 30° C. | 7.5% | 21.8% |
| 40° C. | 5.1% | 13.3% |

| Sucrose ester distribution | | |
|---|---|---|
| Sucrose octa-ester | 80.6% | 78.5% |
| Sucrose hepta-ester | 19.1% | 21.2% |
| Sucrose hexa-ester | 0.3% | 0.3% |
| Sucrose penta-ester | 0% | 0% |

Example 6

High Palmitic Methyl Ester 20 kilograms of palm stearin (available from Felda IFFCO, Cincinnati, Ohio) are placed in a 30 liter reaction vessel equipped with a stirrer and reflux condenser and reacted with 5375 grams of methanol using 226.6 grams of sodium methoxide as catalyst. The mixture is stirred at 65° C. for 6 hours; methanol is allowed to reflux. The reaction mixture is then allowed to rest without stirring until the glycerin byproduct settles to the bottom of the vessel. The glycerin layer is then removed and the methyl ester layer is washed with 10% water by weight of the methyl ester at 30° C. to remove residual methanol, catalyst, soap and any remaining glycerin. The wash process is repeated two additional times. The methyl esters are then dried under vacuum (25 mm Hg) at 95° C. The methyl esters are then distilled in a wiped film evaporator at 195° C. and ~1 mm Hg absolute pressure to separate the methyl esters from any un-reacted glycerides. The methyl esters have the following fatty acid composition:

| | |
|---|---|
| $C_{16}$ | 57.8% |
| $C_{18}$ | 6.9% |
| $C_{18:1}$ cis | 27.5% |
| $C_{18:2}$ cis | 5.9% |

Example 7

High Palmitic SPE IMF

A sucrose polyester sample is prepared using the methyl ester prepared in Example 6. 1073 grams of the methyl ester of Example 1, 212 grams of a milled mixture of sucrose and potassium palmitate and 4.5 grams of potassium carbonate are added to a 5 liter reaction vessel equipped with overhead mechanical stirrer, heating mantel and nitrogen sparge tube. The contents of the reaction flask are heated to 135° C. with vigorous stirring and nitrogen sparge for ~3 hours. Another 1073 grams of the methyl ester of Example 1 is then added along with 4.5 grams of $K_2CO_3$. The reaction is continued at 135° C. until the total conversion of sucrose polyester measures >75% octa-ester.

The crude reaction mix from above is then hydrated with ~230 mls water and the contents of the flask are allowed to sit without stirring. The top layer (oil layer) is decanted away from the hydrated soap layer. The oil layer is then dried at 95° C. (25 mm Hg) until free of residual water. The oil layer is then bleached with 1% Trisyl (available from W.R. Grace) and pressure filtered to remove the bleaching earth. The treated oil layer is then passed through a wiped film evaporator to remove residual methyl esters. The resulting sucrose polyester has the following properties:

| Sucrose ester distribution | |
| --- | --- |
| Sucrose octa-ester | 77.1% |
| Sucrose hepta-ester | 22.9% |
| Sucrose hexa-ester | 0% |
| Sucrose penta-ester | 0% |

| Fatty Acid Composition | |
| --- | --- |
| $C_{16}$ | 59.5% |
| $C_{18}$ | 6% |
| $C_{18:1}$ cis | 28.1% |
| $C_{18:2}$ cis | 6.1% |

Example 8

High Palmitic Olestra® IMF 93 grams of the sucrose polyester from Example 7 are combined with 7 grams of a solid sucrose polyester having a melting point of 65° C. to give a sucrose polyester blend. The solid sucrose polyester has the following properties:

| Sucrose ester distribution of the solid Component | |
| --- | --- |
| Sucrose octa-ester | 77.8% |
| Sucrose hepta-ester | 22.0% |
| Sucrose hexa-ester | 0% |
| Sucrose penta-ester | 0.2% |

| Fatty Acid Composition of the Solid Component | |
| --- | --- |
| $C_{16}$ | 2.7% |
| $C_{18}$ | 3.6% |
| $C_{18:1}$ cis | 4.8% |
| $C_{18:2}$ cis | 6.2% |
| $C_{20:0}$ | 9.7% |
| $C_{22:0}$ | 71.9% |

The resulting sucrose polyester blend (comprising the sucrose polyester from Example 7 and the above detailed solid sucrose polyester) has the following properties:

| Sucrose ester distribution | |
| --- | --- |
| Sucrose octa-ester | 77.2% |
| Sucrose hepta-ester | 22.8% |
| Sucrose hexa-ester | 0% |

| Fatty Acid Composition | |
| --- | --- |
| $C_{16}$ | 56.0% |
| $C_{18}$ | 5.3% |
| $C_{18:1}$ cis | 26.8% |
| $C_{18:2}$ cis | 5.2% |
| $C_{20:0}$ | 1.0% |
| $C_{22:0}$ | 4.8% |
| Thixotropic area: | 55,000 Pa/sec @ 33.3° C. |

| SFC | |
| --- | --- |
| 10° C. | 64.4% |
| 20° C. | 45.9% |
| 30° C. | 17.6% |
| 40° C. | 5.5% |

Example 9

The properties of the sucrose polyester blend of Example 8 were compared to those of liquid sucrose polyesters that were produced on a commercial scale from soybean oil and hydrogenated to produce an IMF sucrose polyester.

| Fatty Acid Composition | Sample Blend from Example 8 | Olestra ® w/Post Hydrogenation |
| --- | --- | --- |
| $C_{16}$ | 56.0% | 11.7% |
| $C_{18}$ | 5.3% | 42.0% |
| $C_{18:1}$ trans | 0% | 20.4% |
| $C_{18:1}$ cis | 26.8% | 21.8% |
| $C_{18:2}$ trans | 0% | 0.7% |
| $C_{18:2}$ trans | 5.2% | 0.7% |
| $C_{20:0}$ | 1.0% | 0% |
| $C_{22:2}$ | 4.8% | 0% |

| SFC | | |
| --- | --- | --- |
| 10° C. | 64.4% | 52.1% |
| 20° C. | 45.9% | 29.0% |
| 30° C. | 17.6% | 21.8% |
| 40° C. | 5.5% | 13.3% |

| Sucrose ester distribution | | |
| --- | --- | --- |
| Sucrose octa-ester | 77.2% | 78.5% |
| Sucrose hepta-ester | 22.8% | 21.2% |
| Sucrose hexa-ester | 0% | 0.3% |
| Sucrose penta-ester | 0% | 0% |

Example 10

All Purpose Shortening 72.73 Kg of High Trans Olestra® IMF (detailed in Example 3), 200.0 Kg of liquid fraction Olean® (detailed in Example 4), 21.82 Kg of Trancendim® T-130 (available from Caravan Ingredients, Kansas City, Kans.), and 69.09 Kg of palm oil are fully melted and mixed in a Votator SM3\41A to form a shortening composition.

Votator Settings:

| | |
| --- | --- |
| Feed Tank Temp. | 150° F. |
| Nitrogen | 10% |
| Post A unit | 61° F. |
| Exit Temp. | 70° F. |
| Rate | 184-186 lb/hr |
| Back Pressure | 350 psi |
| Tempering | 68-70° F. |

The resulting shortening composition has the following properties:

| SFC Values | |
|---|---|
| SFC @ 10 C. | 27.79 |
| SFC @ 21 C. | 18.66 |
| SFC @ 26.7 C. | 13.23 |
| SFC @ 33.3 C. | 8.4 |
| SFC @ 37.8 C. | 6.66 |
| SFC @ 40.0 C. | 6.19 |

Trans Fatty Acid Content: 0.11%
Calorie per 100 g: 225 cal
Firmness: 198,700 Pa
Yield Value: 510 Pa
Fat Crystal Particle Size: 1-3 um
Weight Percentage of Shortening that is Sucrose Polyester: 75%

Example 11

Bakers Shortening 36.36 Kg of High Trans Olestra® IMF (detailed in Example 3), 100.00 Kg of liquid fraction Olean® (detailed in Example 4), 21.82 Kg of Trancendim T-130 (available from Caravan Ingredients, Kansas City, Kans.), 22.17 Kg of palm oil, 1.45 Kg lecithin, and 0.01 Kg of beta-carotene are fully melted and mixed in a Votator SM3\41A to form a shortening composition.
Votator Settings:

| Feed Tank Temp. | 150° F. |
|---|---|
| Nitrogen | None |
| Post A unit | 66-68° F. |
| Exit Temp. | 72-80° F. |
| Rate | 250 lb/hr |
| Back Pressure | 350 psi |
| Tempering | 68-70° F. |

| SFC Values | |
|---|---|
| SFC @ 10 C. | 33.33 |
| SFC @ 21 C. | 24.64 |
| SFC @ 26.7 C. | 20.4 |
| SFC @ 33.3 C. | 14.73 |
| SFC @ 37.8 C. | 10.64 |
| SFC @ 40.0 C. | 9.2 |

Trans Fatty Acid Content: 0.07%
Calorie per 100 g: 225 cal
Firmness: 574,800 Pa
Yield Value: 1347 Pa
Fat Crystal Particle Size: 1-5 um
Weight Percentage of Shortening that is Sucrose Polyester: 75%

Example 12

Bakers Blend Shortening 58.18 Kg of High Trans Olestra® IMF (detailed in Example 3), 160.00 Kg of liquid fraction Olean® (detailed in Example 4), 34.91 Kg of Trancendim T-130 (available from Caravan Ingredients, Kansas City, Kans.), 35.48 Kg of palm oil, 2.33 Kg lecithin, and 0.01 Kg of beta-carotene are fully melted and mixed in a Votator SM3\41A to form a shortening composition.

Bakers Blend is a margarine equivalent. Like butter, margarine contains a small amount of water (typically 20%) where salt and other water-soluble flavorings are placed. The aqueous phase contains: 64.72 Kg of water, 4.36 Kg of NaCl, 3.64 Kg of sugar, and 3.63 g of citric acid (pH 3.0-3.5).
Votator Settings:

| Feed Tank Temp. | 150° F. |
|---|---|
| Nitrogen | None |
| Post A unit | 90° F. |
| Exit Temp. | 93° F. |
| Rate | 318 lb/hr |
| Back Pressure | 350 psi |
| Tempering | 68-70° F. |

| SFC Values | |
|---|---|
| SFC @ 10 C. | 33.11 |
| SFC @ 21 C. | 23.72 |
| SFC @ 26.7 C. | 19.52 |
| SFC @ 33.3 C. | 13.1 |
| SFC @ 37.8 C. | 10.28 |
| SFC @ 40.0 C. | 9.06 |

Trans Fatty Acid Content: 0.06%
Calorie per 100 g: 185 cal
Firmness: 835,800 Pa
Yield Value: 1,947 Pa
Fat Crystal Particle Size: 1-4 um
Weight Percentage of Shortening that is Sucrose Polyester in the fat phase: 75%. This shortening contains 20% water because it is a margarine equivalent. This total olestra in the composition is 60%.

Example 13

All Purpose Shortening 2.0 Kg of High Palmitic Olestra® IMF (detailed in Example 8), 5.5 Kg of liquid fraction Olean® (detailed in Example 4), 0.8 Kg of Trancendim® T-130 (available from Caravan Ingredients, Kansas City, Kans.), and 1.7 Kg of soybean oil are fully melted and mixed in a Votator SM3\41A to form a shortening composition.
Votator Settings:

| Feed Tank Temp. | 68° C. |
|---|---|
| Nitrogen | 90 psi |
| Post A unit | 9.8° C. |
| Exit Temp. | 15.3° C. |
| Rate | 184-186 lb/hr |
| Back Pressure | 1.78 bars |
| Tempering | 70° F. |

The resulting shortening composition has the following properties:

| SFC Values | |
|---|---|
| SFC @ 10° C. | 29.0 |
| SFC @ 20° C. | 22.8 |
| SFC @ 30° C. | 15.3 |
| SFC @ 40.0° C. | 5.7 |

Calorie per 100 g: 225 cal
Firmness: 119,000 Pa

Yield Value: 2750 Pa
Fat Crystal Particle Size: 1-3 um
Weight Percentage of Shortening that is Sucrose Polyester: 75%

Example 14

Prior Shortening Formulation 700 g of Soy IV40 Olestra® IMF (as detailed in Example 5), 1925 g of the liquid fraction Olean® (as detailed in Example 4), 280 g of fully hydrogenated cottonseed oil, and 595 g of soybean oil are fully melted and mixed at 150° F. The mixture is processed in a votator and the finished product is packed at 80° F.

| | |
|---|---|
| SFC @ 10° C. | 32 |
| SFC @ 20° C. | 27 |
| SFC @ 30° C. | 22 |
| SFC @ 40.0° C. | 13 |

Firmness: 91,620 Pa
Yield Value: 99 Pa
Fat Crystal Particle Size: 5-20 um
Weight Percentage of Shortening that is Sucrose Polyester: 75%

When the Prior Shortening Formulation of Example 14 was used to prepare a pie crust, a baking expert judged the pie crust dough to be too sticky for high-speed pie processing equipment. The finished pie crust was judged to be too waxy by a panel of expert tasters.

Example 15

All Purpose Shortening 1925 g of High Trans Olestra® IMF (detailed in Example 3), 2475 g of liquid fraction Olean® (detailed in Example 4), 440 g of Trancendim® T-130 (available from Caravan Ingredients, Kansas City, Kans.), and 935 g of soy oil are fully melted and mixed in an Armfield Mini-Crystallizer (Votator) to form a shortening composition.
Votator Settings:

| | |
|---|---|
| Feed Tank Temp. | 34.9° C. |
| Nitrogen | 10% |
| Exit Temp. | 20.0° C. |
| Pump Speed | 28.7% |
| Back Pressure | 2.2 psi |
| Tempering | 68-70° F. |

The resulting shortening composition has the following properties:

| SFC Values | |
|---|---|
| SFC @ 10 C. | 25 |
| SFC @ 20 C. | 19 |
| SFC @ 30 C. | 13 |
| SFC @ 40 C. | 6 |

Trans Fatty Acid Content: 0.1%
Calorie per 100 g: 225 cal
Firmness: 275,000 Pa
Yield Value: 550 Pa
Fat Crystal Particle Size: 1-3 um
Weight Percentage of Shortening that is Sucrose Polyester: 75%

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A shortening composition comprising from about 40% to about 90% sucrose polyester, by weight, wherein said shortening composition comprises:
    a. from about 5% to about 15% of a hard stock fraction;
    b. from about 10% to about 30% of a low waxiness sucrose polyester intermediate melting fraction having a Solid Fat Index of from about 3% to about 10% solids at 40° C., wherein:
        said low waxiness sucrose polyester intermediate melting fraction comprises a blend of sucrose polyesters; and
        each sucrose polyester comprises a sucrose moiety and a plurality of fatty acid ester moieties, wherein at least five of the available hydroxyl groups on the sucrose are esterified with a fatty acid; and
    c. from about 40% to about 80% of a liquid fraction;
    wherein said shortening composition has, based on total weight of the shortening composition, a Solid Fat Index of from about 5% to about 10% solids at 40° C.;
    a Firmness of from about 90,000 Pa to about 1,500,000 Pa; and a Yield Value of from about 300 Pa to about 10,000 Pa.

2. The shortening composition of claim 1, wherein the Yield Value is from about 500 Pa to about 9,000 Pa.

3. The shortening composition of claim 1, wherein the Yield Value is from about 1,000 Pa to about 8,000 Pa.

4. The shortening composition of claim 1, wherein the Firmness is from about 90,000 Pa to about 900,000 Pa.

5. The shortening composition of claim 1, wherein the Firmness is from about 100,000 Pa to about 600,000 Pa.

6. The shortening composition of claim 1, wherein the average fat crystal particle size is less than about 5 um.

7. The shortening composition of claim 1, wherein from about 60% to about 100% of the sucrose polyester fatty acid ester moieties of the low waxiness sucrose polyester intermediate melting fraction comprise a $C_{18}$ carbon chain with the balance of fatty acid ester moieties independently selected from $C_{12}$-$C_{16}$ or $C_{20}$-$C_{22}$ carbon chains.

8. The shortening composition of claim 1, wherein from about 50% to about 75% of the sucrose polyester fatty acid ester moieties of the low waxiness sucrose polyester intermediate melting fraction are palmitic fatty acid ester moieties.

9. The shortening composition of claim 1, wherein from about 50% to about 90% of the sucrose polyester fatty acid ester moieties of the low waxiness sucrose polyester intermediate melting fraction comprise a $C_{16}$ carbon chain with the balance of fatty acid ester moieties independently selected from $C_{12}$-$C_{14}$ or $C_{18}$-$C_{22}$ carbon chains.

10. The shortening composition according to claim 1, wherein the fatty acid ester moieties of said low waxiness sucrose polyester intermediate melting fraction are derived from an edible oil comprising at least one trans fatty acid.

11. The shortening composition of claim 1, wherein the hard stock fraction comprises monoglycerides and diglycerides.

12. The shortening composition of claim 1, wherein the liquid fraction comprises oil and/or sucrose polyester.

13. The shortening composition of claim 12, wherein the oil comprises an oil selected from a group consisting of rapeseed oil, tallow oil, coconut oil, babassu oil, corn oil, lard, olive oil, peanut oil, sesame oil, soybean oil, canola oil, palm oil, sunflower oil, safflower oil, cottonseed oil, and combinations thereof.

14. The shortening composition of claim 1, wherein from about 40% to about 90% of the sucrose fatty acid ester moieties of the low waxiness sucrose polyester intermediate melting fraction comprise an unsaturated carbon chain.

15. The shortening composition of claim 1, wherein from about 25% to about 50% of the sucrose polyester fatty acid ester moieties of the low waxiness sucrose polyester intermediate melting fraction comprise a trans carbon chain.

16. The shortening composition of claim 15, wherein said trans carbon chain is selected from the group consisting of C18:1 trans, C18:2 trans, and combinations thereof.

* * * * *